(12) United States Patent
Lewin et al.

(10) Patent No.: US 7,459,670 B2
(45) Date of Patent: Dec. 2, 2008

(54) PROXIMITY SENSOR BASED ON PROJECTION OF STRUCTURED LIGHT

(75) Inventors: Andrew C Lewin, Malvern (GB); David A Orchard, Malvern (GB)

(73) Assignee: QinetiQ Limited, London (GB)

( * ) Notice: Subject to any disclaimer, the term of this patent is extended or adjusted under 35 U.S.C. 154(b) by 114 days.

(21) Appl. No.: 10/534,494

(22) PCT Filed: Nov. 11, 2003

(86) PCT No.: PCT/GB03/04861

§ 371 (c)(1),
(2), (4) Date: May 10, 2005

(87) PCT Pub. No.: WO2004/044619

PCT Pub. Date: May 27, 2004

(65) Prior Publication Data

US 2006/0163455 A1  Jul. 27, 2006

(30) Foreign Application Priority Data

Nov. 11, 2003  (GB) .................................. 0226243.4

(51) Int. Cl.
*H01J 40/14* (2006.01)
(52) U.S. Cl. ........................... 250/221; 250/216
(58) Field of Classification Search ................ 250/221, 250/222.1; 356/4.01–4.09
See application file for complete search history.

(56) References Cited

U.S. PATENT DOCUMENTS

| 3,786,238 | A | * | 1/1974 | Heisner ..................... 250/566 |
|---|---|---|---|---|
| 4,020,327 | A | * | 4/1977 | Geary et al. ................ 235/454 |
| 4,294,544 | A | | 10/1981 | Altschuler et al. |
| 4,867,570 | A | | 9/1989 | Sorimachi et al. |
| 5,003,166 | A | | 3/1991 | Girod |
| 5,175,601 | A | | 12/1992 | Fitts |
| 5,585,626 | A | * | 12/1996 | Beck et al. ............... 250/222.1 |
| 5,675,407 | A | | 10/1997 | Geng |
| 5,726,443 | A | * | 3/1998 | Immega et al. ........... 250/227.2 |
| 5,793,035 | A | | 8/1998 | Beck et al. |
| 5,825,476 | A | | 10/1998 | Abitol et al. |

(Continued)

FOREIGN PATENT DOCUMENTS

DE  43 04 815 A  8/1994

(Continued)

OTHER PUBLICATIONS

International Search Report of PCT/GB03/04861 mailed Jun. 1, 2004.

(Continued)

*Primary Examiner*—Thanh X Luu
(74) *Attorney, Agent, or Firm*—Nixon & Vanderhye P.C.

(57) ABSTRACT

This invention relates to a proximity sensor. An illumination means (2) projects an array of spots (40) towards a scene. Detector (8) looks towards the scene through a mask (6). The mask (6) is arranged such that light from a target at a certain range, for instance far object (14) is not transmitted to the detector. Light reflected from a close object (16) however passes through the mask (6) and is incident on the detector (8). A rise in the intensity of incident light at the detector (8) is determined by threshold detector (10) and used to operate an alarm (12).

14 Claims, 3 Drawing Sheets

U.S. PATENT DOCUMENTS

| | | | |
|---|---|---|---|
| 5,852,672 A | 12/1998 | Lu | |
| 5,878,180 A * | 3/1999 | Nothofer et al. | 385/114 |
| 6,147,760 A | 11/2000 | Geng | |
| 6,154,279 A | 11/2000 | Thayer | |
| 6,160,479 A | 12/2000 | Aahlen et al. | |
| 6,318,863 B1 | 11/2001 | Tiao et al. | |
| 6,377,353 B1 | 4/2002 | Ellis | |
| 6,572,139 B2 * | 6/2003 | Adachi | 280/735 |
| 6,732,574 B2 * | 5/2004 | Hajduk et al. | 73/54.05 |
| 6,926,435 B2 * | 8/2005 | Li | 362/555 |
| 6,949,758 B2 * | 9/2005 | Shi et al. | 250/577 |
| 2001/0035636 A1 | 11/2001 | Adachi | |
| 2002/0008055 A1 * | 1/2002 | Campbell et al. | 209/577 |
| 2002/0016631 A1 | 2/2002 | Marchitto et al. | |

FOREIGN PATENT DOCUMENTS

| | | |
|---|---|---|
| DE | 101 49 750 A | 9/2002 |
| EP | 0 994 342 | 4/2000 |
| EP | 1 134 595 A | 9/2001 |
| FR | 2585853 | 2/1987 |
| GB | 2 372 656 | 8/2002 |
| JP | 62-007019 | 1/1987 |
| JP | 62291512 | 12/1987 |
| JP | 63263412 | 11/1994 |
| JP | 10 031073 A | 2/1998 |
| JP | 10062161 | 3/1998 |
| WO | 02/40940 A | 5/2002 |

OTHER PUBLICATIONS

GB Search Report of GB 0226243.4.
P. M. Gourlay et al., "Coherent Kaleidoscope. II. Experimental Observations of Sibling-Spot Formation in Hollow and Solid, Square and Rectangular Waveguides", Applied Optics, Optical Society of America, vol. 33, No. 3, Jan. 20, 1994, pp. 384-396, XP000425016.
Patent Abstracts of Japan, vol. 1998, No. 6, Apr. 10, 1998.
Lewin et al, U.S. Appl. No. 10/534,495, filed May 10, 2005.
Lewin et al, U.S. Appl. No. 10/534,498, filed May 10, 2005.
H. Mass, "Robust Automatic Surface Reconstruction with Structured Light" International Archives of Photogrammetry and Remote Sensing, vol. XXIX, 1982, pp. 1-9.

* cited by examiner

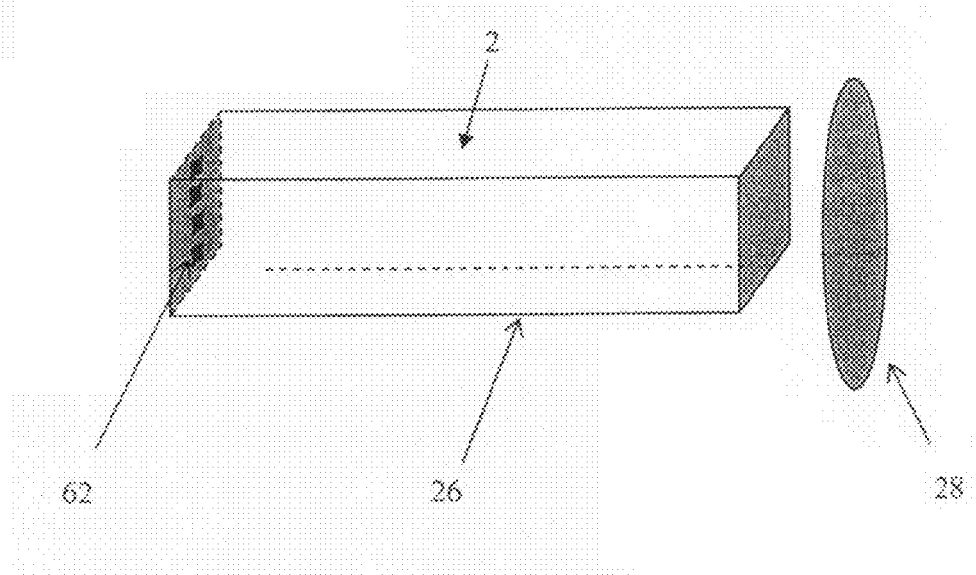

PROXIMITY SENSOR BASED ON PROJECTION OF STRUCTURED LIGHT

This application is the US national phase of international application PCT/GB2003/004861 filed 11 Nov. 2003, which designated the U.S. and claims benefit of GB 0226243.4, dated 11 Nov. 2002, the entire contents of each of which are hereby incorporated by reference.

BACKGROUND OF THE INVENTION

Field of the Invention

The present invention relates to a proximity sensor in particular to a proximity sensor for determining when a certain minimum distance to a target has been reached.

SUMMARY OF THE INVENTION

According to the present invention there is provided a proximity sensor comprising an illumination means for illuminating a scene with an array of spots of light, a detector arranged to receive light reflected from the scene and a mask, located in the optical path of light from the scene to the detector, the mask having transmissive portions and non-transmissive portions and being arranged, together with the illumination means and detector such that, in use, light reflected from a target from within a first range of distances from the sensor is transmitted through the mask to the detector and light from a second range of distances is not transmitted through the mask.

The illumination means projects an array of spots towards a scene and the detector in effect looks towards the scene through the mask. The detector can therefore only see part of the scene through the mask. The position at which the projected spots will appear in the scene depends upon how close a target is to the scene. Therefore with a careful choice of mask and alignment of illumination means and detector the detector can be arranged so that it sees the spots if the target is within a first certain range of distances but can not see the spots if the target is within a second range of distances.

Whether or not the detector can see the spots therefore can be used to give an indication of whether a target is in the first range of distances or second range of distances.

The mask may be arranged such that reflected or scattered light is transmitted to the detector if the target is within a predetermined distance of the sensor and reflected light is not transmitted if the target is outside of that predetermined distance. In this case the sensor could be a simple proximity alarm. A sudden increase in detected light would indicate that a target had come within the predetermined distance of the detector or a sudden decrease could indicate that a target had moved further away relative to the sensor. A sudden change in intensity could therefore be used to trigger an appropriate alarm.

Alternatively the mask could be adapted to transmit light reflected from a target more than a predetermined distance away and not transmit light from within the predetermined distance.

Preferably the illumination means illuminates the scene with spots of infrared light. Spots of infrared light will not be visibly detected which could be useful for some applications. Also the illumination means is preferably modulated at a predetermined frequency and a filter applied to the detector output at the predetermined frequency. Modulating the light source and filtering the detected signal reduces the effects of ambient lighting conditions. Additionally or alternatively the detector could be adapted to receive ambient light from the scene and the effects of the ambient light could be compensated for.

The mask may be adapted to define a plurality of ranges of distance from the sensor and transmit a different amount of light from a target in each distance range. For instance the mask could be substantially non transmitting and have a plurality of transmissive windows. The mask could be adapted such that when a target is located above a certain upper limit distance no reflected light is transmitted through the mask. When an object is introduced which is closer than the upper distance limit but which is further away than a lower distance limit the windows in the mask could be arranged so as to let light from one or more spots reach the detector. If an object was introduced below the lower distance limit the windows in the mask could be arranged to allow light from a greater number of spots to reach the detector. Thus the detector could experience three intensity levels depending upon the location of a target in the scene.

The sensor could be arranged to have a plurality of zones of distance and determine within which zone a target is located. The sensor could then provide a control signal or alarm as appropriate. For instance in application as a proximity sensor for a reversing vehicle the rate of sounding an audible alarm could be increased as the target and sensor get closer.

In order to improve discrimination of the various ranges of distance the illumination means could be adapted to project a plurality of spots at different modulated frequencies and the mask adapted such that at each range of distance a different modulated frequency is transmitted to the detector. In other words each distinct range boundary could have a particular frequency modulation associated with it. Detection of a spot at a particular frequency would then indicate which range zone the target was in.

Conveniently the illumination means comprises a light source arranged to illuminate part of the input face of a light guide, the light guide comprising a tube having substantially reflective sides and being arranged together with projection optics so as to project an array of distinct images of the light source towards the scene.

The light guide in effect operates as a kaleidoscope. Light from the source is reflected from the sides of the tube and can undergo a number or reflection paths within the tube. The result is that multiple images of the light source are produced and projected onto the scene. Thus the scene is illuminated with an array of images of the light source. The source is preferably a simple light emitting diode and the scene is therefore illuminated with an array of spots of light. The source may arranged close enough to the light guide that it only illuminates part thereof or the source may be arranged to illuminate the input face of the light guide through a light guide mask. The light guide mask may be substantially opaque at the radiation of interest and provided with at least one transmissive portion allowing light from the source to illuminate part of the input face of the light guide.

The light guide comprises a tube with substantially reflective walls. Preferably the tube has a constant cross section which is conveniently a regular polygon. Having a regular cross section means that the array of images of the light source will also be regular which is advantageous for proximity sensing. A square section tube is most preferred. The light guide may have a cross section of the order of a few square millimetres to a few tens of square millimetres, say in the range 2-50 $mm^2$ or in the range 5-25 $mm^2$. For a square section tube the side may be in the range 2-5 mm. The size of exit aperture of the light guide, which obviously depends on the cross section, affects the depth of field of the spot projector. A small exit aperture results in a large depth of field which means that the proximity sensor can be used over a larger range of distances. The skilled person will appreciate however that other dimensions could be used and would be appropriate for some applications.

The tube may comprise a hollow tube having reflective internal surfaces, i.e. mirrored internal walls. Alternatively the tube may be fabricated from a solid material and arranged such that a substantial amount of light incident at an interface between the material of the tube and surrounding material undergoes total internal reflection. The tube material may be either coated in a coating with a suitable refractive index or designed to operate in air, in which case the refractive index of the light guide material should be such that total internal reflection occurs at the material air interface.

Using a tube like this as a light guide results in multiple images of the light source being generated which can be projected to the scene. The light guide is easy to manufacture and assemble and couples the majority of the light from the source to the scene. Thus low power sources such as light emitting diodes can be used. As mentioned as the exit aperture can be small the apparatus also has a large depth of field which makes it useful for ranging applications which require spots projected that are separated over a wide range of distances.

The projection optics may comprise a projection lens. The projection lens may be located adjacent the output face of the light guide. In some embodiments where the light guide is solid the lens may be integral to the light guide, i.e. the tube may be shaped at the output face to form a lens.

BRIEF DESCRIPTION OF THE DRAWINGS

The invention will now be described by way of example only with reference to the following drawings of which;

FIG. 6 illustrates a light source comprised of a plurality of LEDs.

DETAILED DISCUSSION OF EMBODIMENTS

Figure 1:
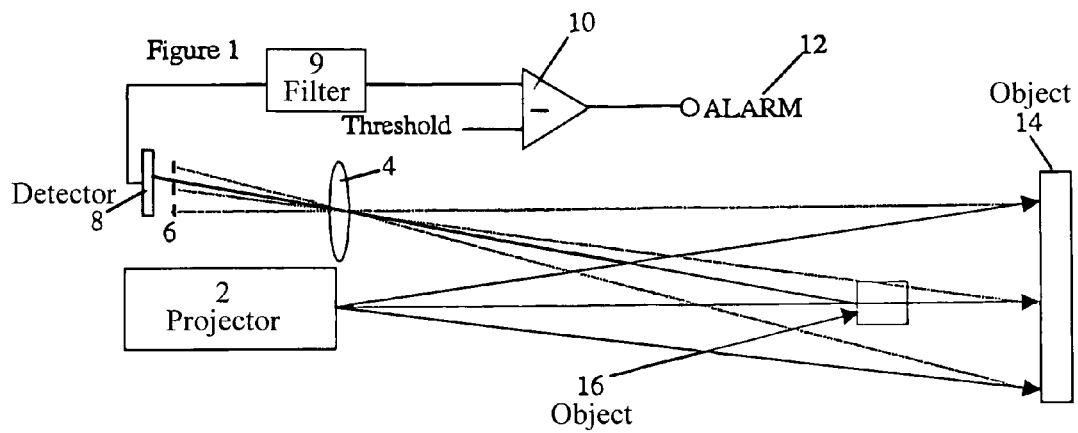
FIG. 1 shows an embodiment of the present invention.

FIG. 1 shows an embodiment of the invention according to the present invention used as a simple proximity sensor. A spot projector 2 projects an array of spots onto a scene. Lens 4 collects light reflected from the scene and focuses it, through mask 6 onto the detector 8. The detector 8 is connected through filter 9 to thresholding circuitry 10 which controls alarm 12.

As can be seen light projected from the spot projector 2 is effectively an array of beams of light with a certain angular separation. If only a distant object 14 is located in the scene the light reflected from the object 14 falls upon a non transmissive portion of the mask. Detector 8 therefore receives no light and thresholding circuitry 10 therefore measures an intensity level less than the predetermined threshold.

However when a closer object 16 is introduced into the scene light reflected from this object is transmitted through mask 6 to detector 8. The measured intensity therefore exceeds the threshold level and thresholding circuitry 10 activates alarm 12 to indicate that an object has come within a certain distance.

The invention relies on a parallax type effect and appropriate arrangement of the spot projector, detector and mask. As can be seen from FIG. 1 the angle from the detector to a spot in the scene varies according to the distance to the object in the scene. Were the mask not present the detector would see the spots at different positions depending on the proximity of the object The mask therefore blocks reflected light from the scene from reaching the detector unless there is a close object in the field of view. This type of proximity sensor therefore gives a simple alarm to indicate an object has approached within a certain minimum distance. Such a proximity sensor could be useful say in applications such as detecting obscuration of a thermal detector.

Thermal detectors such as the single element pyroelectric detector, often referred to as a passive infrared (PIR) sensor, are used in a variety of application such as intruder alarms, fire alarms or automatic lighting. PIR sensors are designed to give a response to the thermal signature of a moving body or bodies within a certain field of view. Typically the sensitivity and field of view of such sensors is designed for a specific application. For example, intruder alarms or automated lighting systems are generally designed to be triggered by movement of a human body.

PIR sensors are vulnerable to being obscured or masked however. Such masking could be deliberate, for instance by covering the sensor with an infrared opaque material or spraying the window with such a material and could be done covertly. The only way to test whether a sensor is working or not is to try to trigger a response, say by walking around the room. This needs positive action to test however and depending on the sensitivity of the sensor may not be possible. For instance a sensor could be designed to detect fires but ignore human movement and would therefore require an intense IR source to test the function. The sensor may also be obscured unintentionally, for instance by moving furniture or other material into the field of view.

The proximity sensor of the present invention could be employed on a PIR sensor to generate an alarm if anything comes within a predetermined distance of the sensor. This could be used as an indication that the sensor is obscured.

Figure 2:
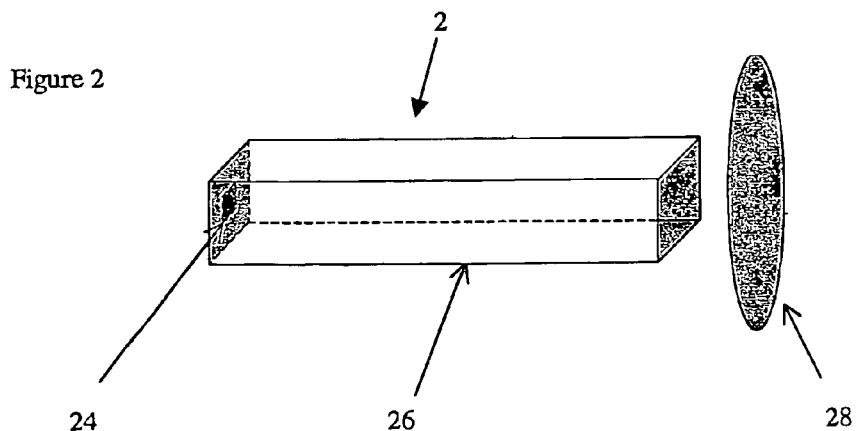
FIG. 2 shows a suitable spot projector for use in the present invention.

The nature of the array of spots projected by the spot projector 2 may vary depending upon the application. For some applications a linear array of spots may be required or a small two dimensional array may be used where the proximity sensor is designed to work with a narrow field of view.

Where the proximity sensor is designed to work over a larger field of view however a relatively large regular array of spots is preferred. One particularly suitable spot projector for projecting such an array of spots is shown in FIG. 2.

A light source 24 is located adjacent an input face of a kaleidoscope 26. At the other end is located a simple projection lens 28. The projection lens is shown spaced from the kaleidoscope for the purposes of clarity but would generally be located adjacent the output face of the kaleidoscope.

The light source 24 is an infrared emitting light emitting diode (LED). Infrared is useful as the array of projected spots need not interfere with a visual image being acquired and infrared LEDs and detectors are reasonably inexpensive. However the skilled person would appreciate that other wavelengths and other light sources could be used for other applications without departing from the spirit of the invention. FIG. 6 shows an embodiment wherein the light source comprises an array 62 of LEDs.

The LED 24 is located adjacent the input face of the kaleidoscope so as to illuminate only a part thereof. In an alternative embodiment however the LED could illuminate the input face of the kaleidoscope through a mask, the mask being arranged with one or more transmissive portions for allowing light through to part of the input face of the kaleidoscope. The kaleidoscope will replicate the image of the spots of light on the input face in the same manner as were the LED adjacent but the use of a mask can be advantageous. A mask may be easier to form and/or locate accurately at the input face of the kaleidoscope that an LED or LED array. Further the choice of LED (or light source generally) can be broadened as size is not a limitation. The LED may be located spaced away from the mask, in which case a homogeniser (not shown) is preferably located between the light source and the input mask to ensure uniform illumination.

The kaleidoscope is a hollow tube with internally reflective walls. The kaleidoscope could be made from any material with suitable rigidity and the internal walls coated with suitable dielectric coatings. However the skilled person would appreciate that the kaleidoscope could comprise a solid bar. Any material which is transparent at the wavelength of operation of the LED would suffice, such as clear optical glass. The material would need to be arranged such that at the interface between the kaleidoscope and the surrounding air the light is totally internally reflected within the kaleidoscope. Where high projection angles are required this could require the kaleidoscope material to be cladded in a reflective material. An ideal kaleidoscope would have perfectly rectilinear walls with 100% reflectivity. It should be noted that a hollow kaleidoscope may not have an input or output face as such but the entrance and exit to the hollow kaleidoscope should be regarded as the face for the purposes of this specification.

Figure 3:
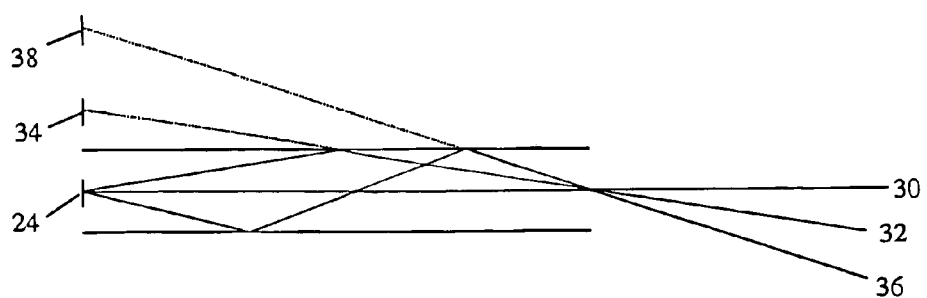
FIG. 3 illustrates the principle of operation of the spot projector shown in FIG. 2.

The effect of the kaleidoscope tube is such that multiple images of the LED, either directly or as seen through the mask, can be seen at the output end of the kaleidoscope. The principle is illustrated with reference to FIG. 3. Light from the LED 24 may be transmitted directly along the kaleidoscope undergoing no reflection at all—path 30. Some light however will be reflected once and will follow path 32. Viewed from the end of the kaleidoscope this will result in a virtual source 34 being seen. Light undergoing two reflections would travel along path 36 resulting in another virtual source 38 being observed.

The dimensions of the device are tailored for the intended application. Imagine that the LED 24 emits light into a cone with a full angle of 90°. The number of spots viewed on either side of the centre, unreflected, spot will be equal to the kaleidoscope length divided by its width. The ratio of spot separation to spot size is determined by the ratio of kaleidoscope width to LED size. Thus a 200 μm wide LED or transmissive mask window and a kaleidoscope 30 mm long by 1 mm square will produce a square grid of 61 spots on a side separated by five times their width (when focused). Depending upon the application kaleidoscopes having sides of 2-5 mm may be used giving a projection angle of approximately 50°-100° and depth of field suitable for ranging from 100 mm to infinity.

Projection lens 28 is a simple singlet lens arranged at the end of kaleidoscope and is chosen so as to project the array of images of the LED 24 onto the scene. The projection geometry again can be chosen according to the application and the depth of field required but a simple geometry is to place the array of spots at or close to the focal plane of the lens.

Figure 4A:
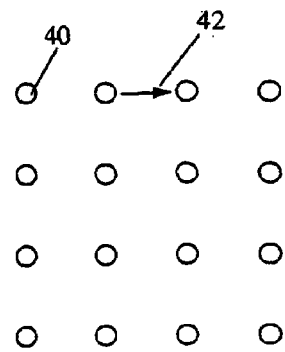
FIG. 4 shows an array of spots projected by a spot projector and a suitable mask for use in the invention.

As mentioned the resulting projected array will therefore be a square grid of spots. FIG. 4*a* shows part of a scene as it appears to the detector when the target is a flat surface. The array is an x-y square grid of spots 40. Referring back to FIG. 1 it can be seen that the apparent position in the detected scene of any projected spot varies with range to the target. If the detector and the spot projector are located in the x-z plane there is no separation in the y direction and therefore the apparent motion of the spot in the scene as the range is varied will be in a direction parallel to the x-direction as illustrated by arrow 42.

Figure 4B:
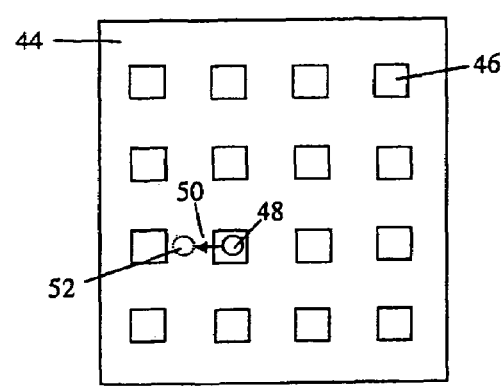

A suitable mask is therefore shown in FIG. 4*b*. This mask is a sheet 44 of material which is opaque at the wavelength of interest The sheet is provided with a series of apertures 46. The apertures are arranged in a square grid and are sized and spaced so that at the operating distance in front of the detector a spot at the predetermined range could be seen through each aperture. The mask is located at the operating distance in front of the detector and is arranged such that when a target is below a certain range a spot is visible through the aperture, as indicated by spot 48. However as the target is moved away from the apparatus each spot appears to move in the scene in the direction indicated by arrow 50 until it is in a position 52 where it is no longer visible through the aperture and is blocked by the opaque material.

This mask can therefore be used with a sensor which either detects when an object has approached within a certain distance of the sensor—as indicated by an increase in the light intensity as the spots are brought into view—or when an object has moved more than a certain distance away—as indicated when the spots move out of view and the intensity drops.

Having most of the mask opaque cuts down on the amount of ambient light falling on the detector which helps discrimination and reduces the sensitivity required by the detector. However the mask could be mainly transparent with opaque parts if required. Also the apertures in an opaque mask could be covered with a transparent material to help protect the detector.

The detector 8 may be a simple intensity detector integrating the received intensity across its whole area or could comprise an array of detector elements.

The threshold level of intensity increase could be reasonably large such that the majority of the projected spots in the projected array must be visible to the detector before an alarm is raised. This would be useful where it is expected that an intruding object would in effect fill the whole field of view. However if an object was expected to fill only part of the scene only some of the projected spots would be visible to the detector. Thus the threshold level will be set according to the particular application as would be understood by one skilled in the art.

A mask that allows discrimination between several groups of ranges is shown in FIG. 5. The mask is again a sheet of opaque material 44 having an array of apertures therein. Four apertures 56*a-d* are shown for clarity although in reality the mask may be made up of repeating groups of these apertures. The apertures are again sized and shaped so that each aperture could show a spot reflected from a target at a predetermined range. However the apertures are differently sized and are extended by different amounts in the direction of apparent movement of the spots in the scene with varying range. FIGS. 5*a* to 5*e* show the positions of four spots 58*a-d* in the projected array reflected from a target at progressively closer range.

Figure 5A:
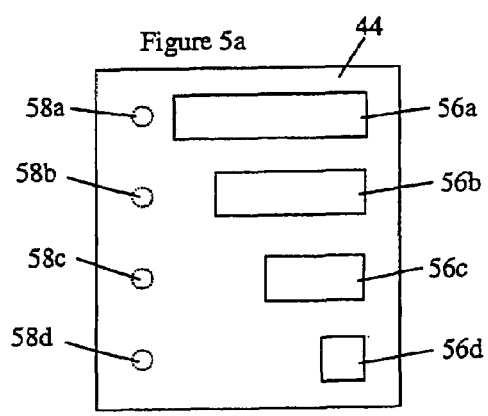
FIG. 5 shows a mask useful for another embodiment of the invention and illustrates how the invention can be used to give indications that an object is within distinct range bands.
Figure 5B:
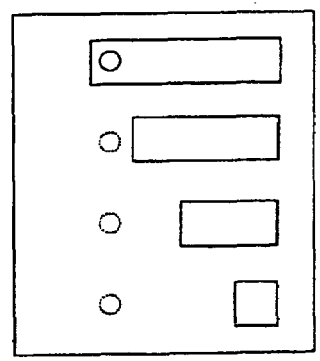
Figure 5C:
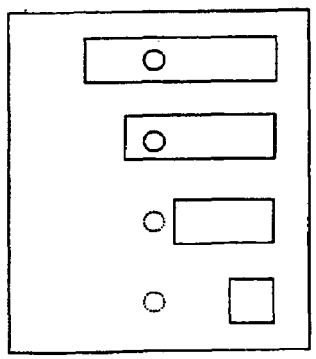
Figure 5D:
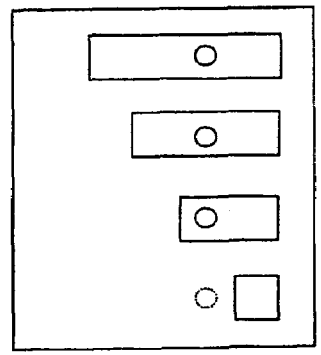
Figure 5E:
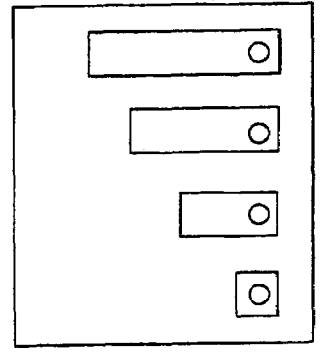

In FIG. 5*a* the target is far away and none of the spots 58*a-d* are visible through the apertures. If the target moves closer however spot 58*a* becomes visible through aperture 56*a*. None of the other spots 58*b-d* are visible through the other apertures however. In FIG. 5*c* the target has moved closer still and now spots 58*a* and 58*b* are visible through their respective apertures 56*a* and 56*b* but the other two spots are not yet visible. FIGS. 5*d* and 5*e* shows that as the target moves closer still spots 58*c* becomes visible followed by spot 58*d*.

It can therefore be seen that the detector will see five distinct intensity levels as a target moves closer corresponding to no spots being visible or one, two, three or four spots being visible. Therefore the different intensity levels could be used to give an indication that a target is within a certain range boundary. Note that this embodiment, using a discriminating threshold level to determine the range, will only generally be appropriate where the targets are known to be of standard reflectivity and will fill the entire field of view at all ranges. If targets were different sizes a small target may generate a different intensity to a larger target and a more reflective target would generate a greater intensity than a less reflective one.

Where target consistency is not known several detectors could be used, each having a mask arranged so as to pass light reflected or scattered from spots at different ranges, i.e. each detector would have a single comparison to determine whether an object was within a certain range but the range for each detector could be different.

Alternatively the embodiment described with reference to FIG. 5 could be used with a means of determining which spots contribute to the overall intensity on the detector. This could be achieved by modulating the spots present in the scene. For instance imagine each of the four spots in FIGS. 5*a-e* was transmitted at a different modulated frequency. The single from the detector 8 would then have up to four different frequency components. The detected signal could then be processed in turn for each frequency component to determine whether there is any signal through the corresponding family of apertures. In other words if spot 58*a* were modulated at frequency $f_1$ identification of a signal component in the detected signal at $f_1$ would indicate that a target was close enough that a spot appeared in aperture 56*a*. Absence of frequency component $f_2$ corresponding to spot 58*b* would mean that the situation shown in FIG. 5*b* applied. Thus could be detected irrespective of whether an object is large or small or reflective or not as it is the detection of the relevant frequency component which is indicative of range.

Using a spot projector as shown in FIG. 2 to produce such a modulated output would simply involve replacing the single LED 24 with a row 64 of 4 LEDs (such as shown in FIG. 6) each modulated at a different frequency. Modulating the frequency in this way thus allows incremental range discrimination but reduces the density of coverage to the scene as each spot can only be used for one of the possible ranges. Alternatively where an input mask is used for the input to the kaleidoscope the mask may comprise a plurality of windows each window comprising a modulator operating at a different frequency.

Imagine that an arrangement like this is used as a proximity sensor for a vehicle to aid reversing. When the vehicle starts reversing there is no target nearby and so the situation is that shown in FIG. 5*a*, no spots in view. As reversing continues the vehicle could start to approach an object such as another vehicle or a wall. Within a certain range spot 58*a* enters the field of view through aperture 56*a*. The this causes a certain increase in the intensity level which prompts an audible alarm, say a beep repeating at a certain frequency. As the vehicle keeps reversing another spot, spot 58*b* becomes visible to the detector and so there is another jump in intensity. The apparatus may then increase the frequency at which the audible beep is repeated. Another increase in intensity by spot 58*c* coming into view would prompt another increase in frequency and finally if spot 58*d* also came into view the audible alarm could become constant. The apparatus could be arranged such that the first spot 58*a* comes into view at a range of a tens of centimetres whereas the last spot 58*d* comes into view at a range of just a few centimetres.

As mentioned each spot will appear to move in the detected scene as the range to the target from which it is reflected is varied. Each spot could therefore be said to have a locus of apparent movement in the scene with varying range. If the locus of apparent movement of two spots were to overlap it is possible that not only would a projected spot be visible through an aperture at a first distance and disappears from view as the range to the target is increased as desired, but another spot may start to become visible through that aperture as the range is increased. This could obviously lead to false positives being recorded. The degree of apparent motion of a spot in the scene depends upon the baseline or separation of the spot projector and the detector and therefore a small baseline leads to a low apparent motion of a spot in the scene. However a certain degree of apparent movement is required for the apparatus to function appropriately.

The spacing of spots in the projected array is another factor that can be controlled to reduce the possibility of overlap. Also the projected array can be arranged relative to the detector and spot projector so as to ensure that the position of adjacent spots could not overlap at all. The direction of apparent motion of the spots in the array will be parallel to the axis of separation of the detector and the projector. If the array is tilted with respect to the axis of separation the possibility of overlap is reduced—in effect if the array projected is an x-y grid the detector and projector are separated in both the x and y directions.

The invention claimed is:

1. A proximity sensor comprising:
   an illumination means for illuminating a scene with an array of spots of light,
   a detector arranged to receive light reflected from the scene and
   a mask, located in the optical path of light from the scene to the detector, the mask having transmissive portions and non-transmissive portions and being arranged, together with the illumination means and detector such that light reflected from a target from within a first range of distances from the sensor is transmitted through the mask to the detector and light from a second range of distances is not transmitted through the mask, wherein the illumination means comprises a light source arranged to illuminate part of the input face of a light guide, the light guide comprising a tube having substantially reflective sides and being arranged together with projection optics so as to project an array of distinct images of the light source towards the scene.

2. A proximity sensor as claimed in claim 1 wherein the mask is arranged such that reflected light is transmitted to the detector if the target is within a predetermined distance of the sensor and reflected light is not transmitted if the target is outside of that predetermined distance.

3. A proximity sensor as claimed in claim 1 wherein the mask is adapted to transmit light reflected from a target more than a predetermined distance away from the sensor and not transmit light from within the predetermined distance.

4. A proximity sensor as claimed in claim 1 wherein the illumination means illuminates the scene with spots of infrared light.

5. A proximity sensor as claimed in claim 1 wherein the illumination means is modulated at a predetermined frequency and a filter is applied to the detector at the predetermined frequency.

6. A proximity sensor as claimed in claim 1 wherein the detector is adapted to receive ambient light from the scene and compensate for the effects of the ambient light.

7. A proximity sensor as claimed in claim 1 wherein the mask is adapted to define a plurality of ranges of distance from the sensor and transmit a different amount of reflected light from a target in each distance range.

8. A proximity sensor as claimed in claim 7 wherein the illumination means is adapted to project a plurality of spots at different modulated frequencies and the mask is adapted such that at each range of distance a different modulated frequency is transmitted to the detector.

9. A proximity sensor as claimed in claim 1 wherein the mask comprises a substantially non transmitting material having a plurality of transmissive windows.

10. A proximity sensor as claimed in claim 1 wherein the light guide comprises a tube with a square cross section.

11. A proximity sensor as claimed in claim 1 wherein the tube comprises a hollow tube having reflective internal surfaces.

12. A proximity sensor as claimed in claim 1 wherein the tube comprises a solid material, arranged such that a substantial amount of light incident at an interface between the material of the tube and surrounding material undergoes total internal reflection.

13. A proximity sensor as claimed in claim 1 wherein the light source comprises an LED.

14. A proximity sensor as claimed in claim 1 wherein the light source comprises an array of LEDs.

* * * * *